US011346320B2

(12) United States Patent
Larsen et al.

(10) Patent No.: US 11,346,320 B2
(45) Date of Patent: May 31, 2022

(54) WIND TURBINE BLADE LEADING EDGE PAIRING

(71) Applicant: Vestas Wind Systems A/S, Aarhus N. (DK)

(72) Inventors: Gerner Larsen, Hinnerup (DK); Ian Stewart, Southhampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/059,675

(22) PCT Filed: May 29, 2019

(86) PCT No.: PCT/DK2019/050168
§ 371 (c)(1),
(2) Date: Nov. 30, 2020

(87) PCT Pub. No.: WO2019/228599
PCT Pub. Date: Dec. 5, 2019

(65) Prior Publication Data
US 2021/0207576 A1    Jul. 8, 2021

(30) Foreign Application Priority Data
May 31, 2018  (DK) ........................... PA 2018 70318

(51) Int. Cl.
*F03D 1/06*      (2006.01)
*F03D 80/50*     (2016.01)

(52) U.S. Cl.
CPC .......... *F03D 1/0683* (2013.01); *F03D 80/50* (2016.05); *F05B 2230/80* (2013.01);
(Continued)

(58) Field of Classification Search
CPC ........ F01D 5/288; F01D 5/286; F04D 29/324; F04D 29/39–388; F04D 19/002; F03D 1/0683
See application file for complete search history.

(56) References Cited

U.S. PATENT DOCUMENTS 5,782,607 A    7/1998  Smith et al.
8,529,212 B2 *  9/2013  Smith ................... F04D 25/088
                                                    416/226

(Continued)

FOREIGN PATENT DOCUMENTS

DK  PCT/DK2019/000104  *  7/2019
EP         2901010 A1     8/2015
(Continued)

OTHER PUBLICATIONS

Danish Patent and Trademark Office, Search and Examination Report in PA 2018 70318, dated Nov. 1, 2016.
(Continued)

*Primary Examiner* — Topaz L. Elliott
(74) *Attorney, Agent, or Firm* — Wood Herron & Evans LLP

(57) ABSTRACT

A wind turbine blade has a blade body and a leading edge fairing. The blade body has a root, a tip, and a longitudinal direction extending between the root and the tip. The 5 blade body also has a channel extending in the longitudinal direction. The leading edge fairing has a projection extending into the channel and extending in the longitudinal direction so as to be received in the channel. Also, a leading edge fairing for attachment to a blade body of a wind turbine blade; a method of fitting a leading edge fairing to a wind turbine blade; and a kit of parts with a number of the leading edge fairings.

19 Claims, 4 Drawing Sheets

(52) U.S. Cl.
CPC ... *F05B 2240/302* (2013.01); *F05B 2240/303* (2020.08); *F05B 2260/302* (2013.01)

(56) References Cited

U.S. PATENT DOCUMENTS

| | | | | |
|---|---|---|---|---|
| 9,016,989 | B2* | 4/2015 | Nagabhushana | B60P 3/40 |
| | | | | 410/44 |
| 9,664,201 | B2* | 5/2017 | Dudon | C23C 24/04 |
| 9,920,631 | B2* | 3/2018 | Tellier | B23P 17/00 |
| 10,035,578 | B2* | 7/2018 | Nordin | F01D 5/282 |
| 10,539,025 | B2* | 1/2020 | Kray | F01D 5/288 |
| 2007/0036659 | A1* | 2/2007 | Hibbard | B29C 63/22 |
| | | | | 416/233 |
| 2010/0104461 | A1* | 4/2010 | Smith | F01D 5/141 |
| | | | | 417/423.1 |
| 2014/0193271 | A1* | 7/2014 | Dudon | F04D 29/324 |
| | | | | 416/241 R |
| 2015/0026980 | A1* | 1/2015 | Tellier | F01D 25/00 |
| | | | | 29/889.1 |
| 2015/0198141 | A1* | 7/2015 | Hayden | F01D 5/28 |
| | | | | 416/1 |
| 2015/0298791 | A1* | 10/2015 | Nordin | B64D 15/12 |
| | | | | 244/45 R |
| 2016/0348643 | A1* | 12/2016 | Fujioka | F03D 9/25 |
| 2017/0058863 | A1 | 3/2017 | Yarbrough et al. | |
| 2017/0122287 | A1* | 5/2017 | Dobbe | F03D 1/0675 |
| 2017/0226865 | A1* | 8/2017 | Kray | F01D 5/288 |
| 2019/0277142 | A1* | 9/2019 | Okabe | B23P 15/04 |
| 2021/0215140 | A1* | 7/2021 | Kratmann | F03D 80/00 |

FOREIGN PATENT DOCUMENTS

| | | | |
|---|---|---|---|
| EP | 2927482 A1 | 10/2015 | |
| EP | 3098438 A1 | 11/2016 | |
| ES | 2333929 A1 * | 3/2010 | F03D 80/50 |
| KR | 102338703 B1 * | 12/2021 | F03D 1/0675 |
| WO | 2010117262 A1 | 10/2010 | |
| WO | 2017012632 A1 | 1/2017 | |
| WO | WO-2018157929 A1 * | 9/2018 | F03D 1/0675 |
| WO | WO-2019179583 A1 * | 9/2019 | F03D 80/50 |
| WO | WO-2020231828 A1 * | 11/2020 | F03D 1/0675 |

OTHER PUBLICATIONS

European Patent Office, International Search Report and Written Opinion in PCT/DK2019/050168, dated Aug. 19, 2019.

* cited by examiner

WIND TURBINE BLADE LEADING EDGE PAIRING

FIELD OF THE INVENTION

The present invention relates to a wind turbine blade having a leading edge fairing, a method of attaching a leading edge fairing to a wind turbine blade, a leading edge fairing and a kit of parts comprising a plurality of the fairings.

BACKGROUND OF THE INVENTION

Wind turbine blades, especially though not exclusively those having a high tip velocity, can suffer the problem of leading edge erosion due to droplet (e.g. rain, hailstone, etc.) or particle (e.g. ice, sand, dust, insect debris, etc.) impingement. The erosion can impair the surface smoothness of the blade leading edge leading to a reduction in aerodynamic efficiency and performance of the blade and therefore of the wind turbine as a whole. The decreased surface smoothness can also contribute to increased levels of noise generated by airflow over the blade surface.

SUMMARY OF THE INVENTION

A first aspect of the invention provides a wind turbine blade comprising: a blade body having a root, a tip, and a longitudinal direction extending between the root and the tip; and a leading edge fairing, wherein the blade body has a channel extending in the longitudinal direction, and wherein the leading edge fairing has a projection extending into the channel and extending in the longitudinal direction so as to be received in the channel.

A second aspect of the invention provides a method of fitting a leading edge fairing to a wind turbine blade, comprising: providing a blade body having a root, a tip, and a longitudinal direction extending between the root and the tip, wherein the blade body has a channel extending in the longitudinal direction; providing a leading edge fairing having a projection; and attaching the leading edge fairing to the blade body by inserting the projection in the channel whereby the projection extends in the longitudinal direction.

A third aspect of the invention provides a leading edge fairing for attachment to a blade body of a wind turbine blade, the leading edge fairing comprising an aerodynamic surface, a reverse surface opposite the aerodynamic surface, and a projection extending away from the reverse surface and extending in the longitudinal direction of the leading edge fairing, wherein the projection is configured to be received in a channel of the blade body, which channel extends in the longitudinal direction of the blade body between a root and a tip of the blade.

A further aspect of the invention provides a kit of parts comprising a plurality of the leading edge fairings according to the third aspect, wherein the plurality of fairings have different leading edge radii and/or planform curvature.

The invention is advantageous in that the leading edge fairing may be a modular, replaceable part of the blade. As the leading edge fairing is susceptible to erosion it can be readily replaced without affecting the load bearing structure of the blade.

The longitudinally extending channel and longitudinally extending projection enable adjustment of the leading edge fairing relative to the blade body along the longitudinal direction during attachment of the leading edge fairing to the blade body. This adjustment can be used to accommodate tolerances which can build up during manufacture.

The thickness of the blade at a location where the leading edge fairing projection is received in the channel can be particularly susceptible to tolerance build up in the blade body during manufacture. The fairing can be sufficiently flexible to accommodate this tolerance in the blade thickness direction.

The channel and the projection may have substantially corresponding profiles.

The channel and the projection may have mechanically interlocking profiles extending in the longitudinal direction.

The channel and/or the projection may have substantially parallel sides extending in the longitudinal direction.

The channel may have a depth direction, and the channel and the projection may be configured to resist pull-out of the projection from the channel in the depth direction of the channel.

The projection may be integrally formed with the leading edge fairing.

The channel may be formed in a moulded component.

The blade body may have a groove extending in the longitudinal direction and the moulded component may be received in the groove.

The moulded component and the groove may have mechanically interlocking profiles. The projection may be held in the channel by one of more of a magnet, a fastener, a snap-fit connection or an adhesive.

The one or more fasteners may extend through the projection.

The leading edge fairing may have a plurality of projections each configured to be received in a respective channel.

The leading edge fairing may have a generally C-shaped profile with a leading edge and two trailing edges.

The leading edge fairing may have a projection adjacent each trailing edge.

The leading edge fairing may further include an erosion protection strip. The erosion strip may be located adjacent the leading edge of the generally C-shaped profile. The leading edge fairing may include thermoplastic, metallic or composite material. The blade body may comprise a rebate and the leading edge fairing may be located in the rebate such that an outer surface of the leading edge fairing and an outer surface of the blade body form a substantially continuous contour.

The method of the second aspect may further comprise a preceding step of removing an existing leading edge fairing from the blade body to effect a leading edge fairing replacement.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness and chord are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

Figure 1:
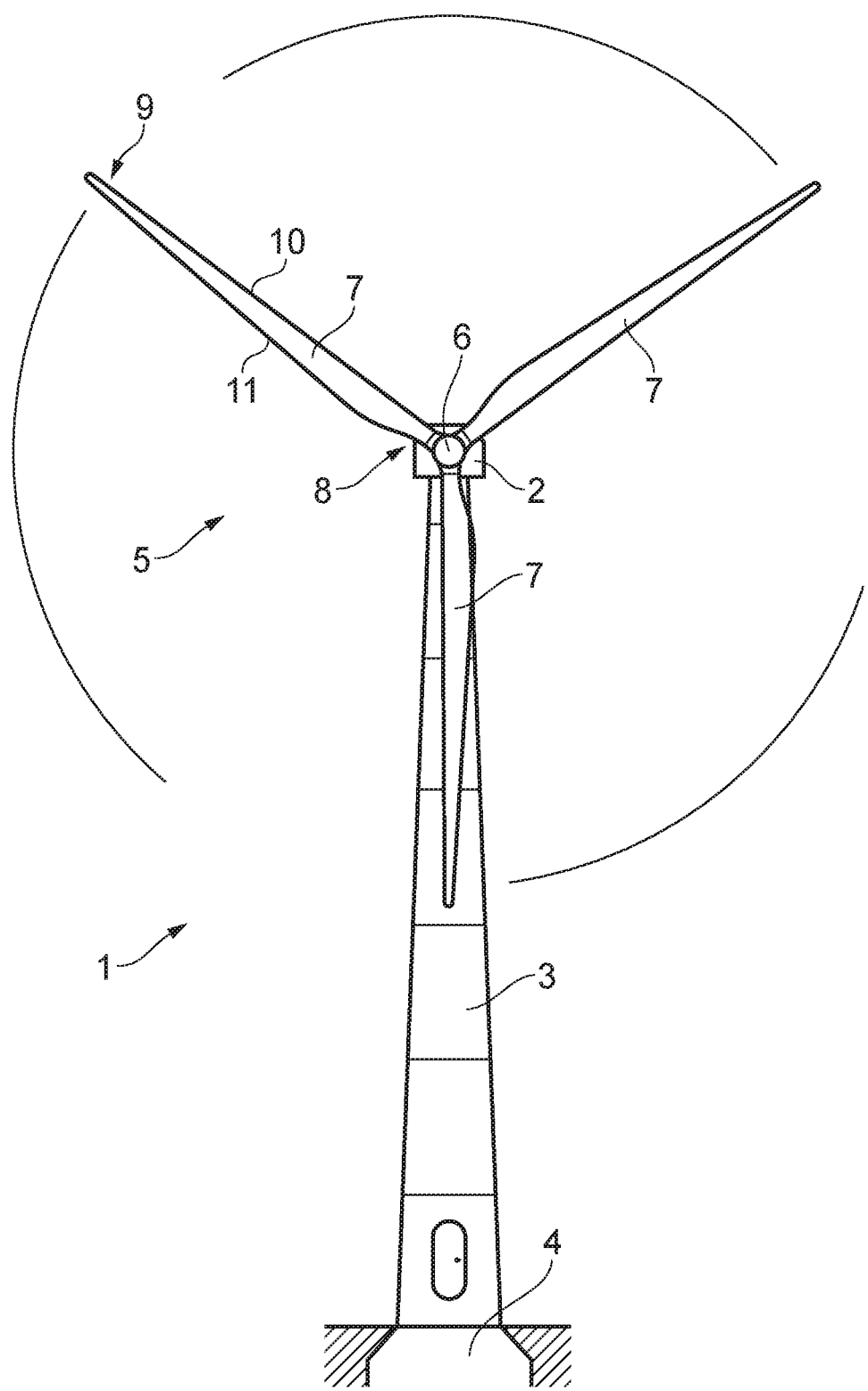
FIG. 1 shows a wind turbine.

FIG. 1 shows a wind turbine 1 including a nacelle 2 supported on a tower 3 that is mounted on a foundation 4. The wind turbine 1 depicted here is an onshore wind turbine such that the foundation 4 is embedded in the ground, but the wind turbine 1 could be an offshore installation in which case the foundation 4 would be provided by a suitable marine platform, such as a monopile or jacket.

The nacelle 2 supports a rotor 5 comprising a hub 6 to which three blades 7 are attached. It will be noted that the wind turbine 1 is the common type of horizontal axis wind turbine (HAWT) such that the rotor 5 is mounted at the nacelle 2 to rotate about a substantially horizontal axis defined at the centre at the hub 6. As is known, the blades 7 are acted on by the wind which causes the rotor 5 to rotate about its axis thereby operating generating equipment through a gearbox (not shown) that is housed in the nacelle 2. The generating equipment is not shown in FIG. 1 since it is not central to the examples of the invention.

Each of the blades 7 has a root end 8 proximal to the hub 6 and a tip end 9 distal from the hub 6. A leading edge 10 and a trailing edge 11 extend between the root end 8 and tip end 9, and each of the blades 7 has a respective aerodynamic high pressure surface (i.e. the pressure surface) and an aerodynamic low pressure surface (i.e. the suction surface) surface extending between the leading 10 and trailing edges 11 of the blade 7.

Figure 2:
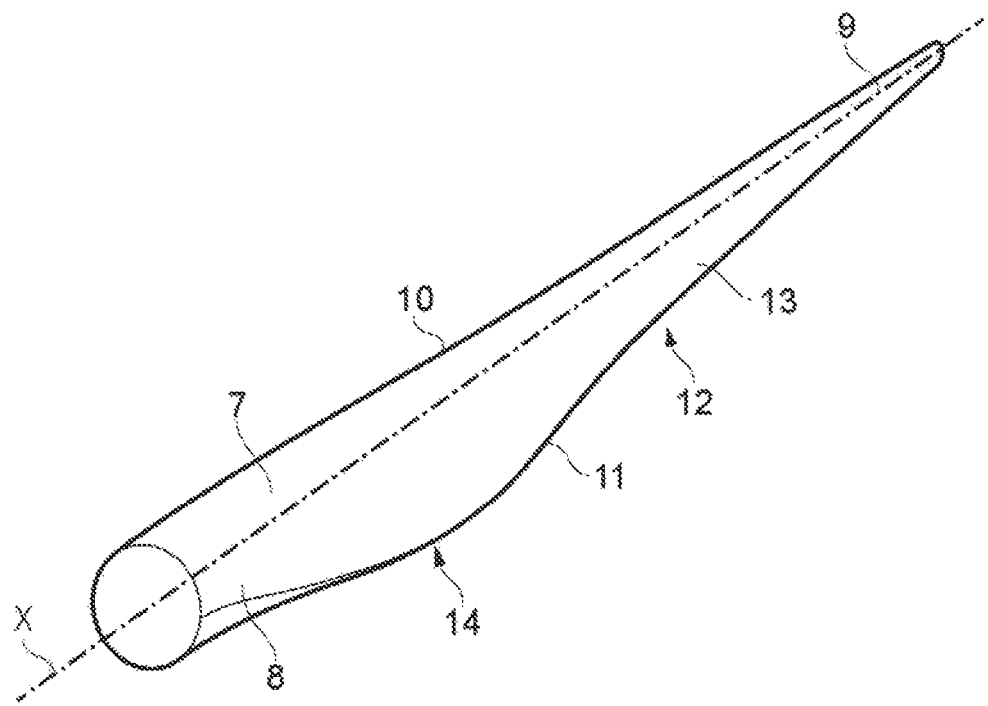
FIG. 2 shows a blade of the wind turbine of FIG. 1.

FIG. 2 shows a perspective view of one of the blades 7 showing the root end 8, the tip end 9, a longitudinal (or spanwise) axis X extending between the root end 8 and the tip end 9 of the blade 7. Also shown is the blade leading edge 10 and the blade trailing edge 11. The blade chord extends between the leading edge 10 and the trailing edge 11 in a straight line perpendicular to the longitudinal axis X. The blade has a pressure surface 12 extending between the leading edge 10 and the trailing edge 11 on one side of the blade and a suction surface 13 which also extends between the leading edge 10 and the trailing edge 11 on the opposite side of the blade to the pressure surface 12. The blade 7 has a "shoulder" 14 where the blade chord reaches a maximum.

Figure 3:
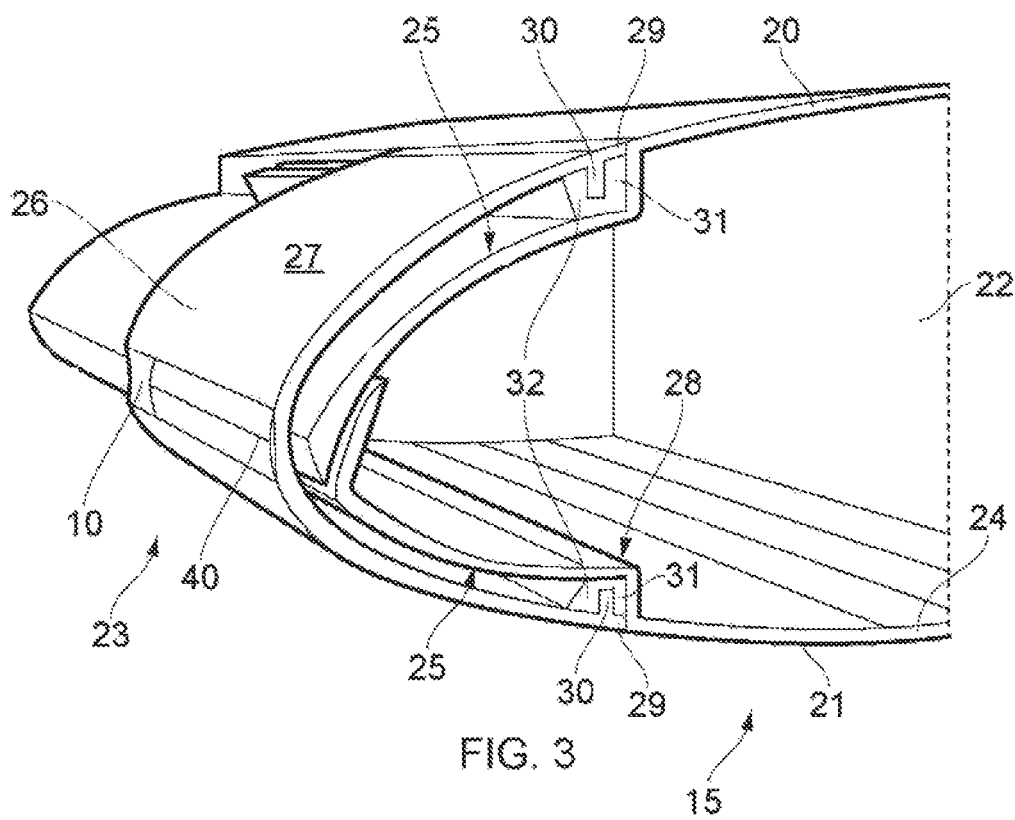
FIG. 3 shows a partial cut away view of the blade body having a leading edge fairing according to a first example.

FIG. 3 shows a partial cut away view of the leading ledge region of the blade 7 in accordance with a first example. As can be seen from FIG. 3 the blade has a blade body 15. The blade body 15 has a loadbearing structure which includes first and second half shells 20, 21 and a shear web 22 extending between the half shells. The first half shell 20 extends generally between the leading edge 10 and trailing edge 11 of the blade 7. The second half shell 21 also extends generally between the leading edge 10 and the trailing edge 11 of the blade 7. The shear web 22 extends between the first half shell 20 and the second half shell 21 and also extends generally in the longitudinal direction X of the blade. The first half shell 20 has an exterior surface which forms the suction surface 13 of the blade. The second half shell 21 has an exterior which forms the pressure surface 12 of the blade. In the blade leading edge region 23 the first and second half shells 20, 21 overlap and are joined together, e.g. by bonding with adhesive. The first and second half shells 20, 21 are also joined to the shear web 22, e.g. by bonding with adhesive. The two half shells together with the shear web form the primary loadbearing structure of the blade 7.

The first and second half shells 20, 21 will be collectively referred to as the blade shell 24 in the following and it will be appreciated that the blade shell 24 need not be formed as two half shells which are subsequently joined together but may be formed as a unitary shell structure, together with the shear web, in a "one shot" single shell fabrication process.

Regardless of the manner in which the blade shell 24 is constructed, the blade shell 24 at the leading edge 23 has a rebate 25 where the blade shell 24 is stepped back towards the hollow interior of the blade 7. A leading edge fairing 26 extends around the leading edge region 23 and has an outer aerodynamic surface 27 which forms a continuous contour with the outer aerodynamic surfaces of the blade shell 24. In other words, the blade shell 24 has a rebate 25 stepped back from the aerofoil section profile of the blade 7 in the blade leading edge region. The leading edge fairing substantially completes the aerofoil section profile in the blade leading edge region.

The rebate 25 in the blade shell 24 is formed by a step or shoulder 28 in the blade shell a distance aft of the blade leading edge 10 but forward of the shear web 22. Optionally, the rebate 25 may be formed over a chordwise distance approximately half way between the blade leading edge 10 and the shear web 22. A gap, e.g. an air gap, may be formed between the blade shell 24 and the leading edge fairing 26. Alternatively, the leading edge fairing 26 may form substantially no gap with the blade shell 24 at the rebate 25.

The leading edge fairing 26 has a generally C shaped cross section profile to provide a fairing leading edge and two fairing trailing edges 29. The fairing 26 has an outer aerodynamic surface and a reverse surface opposite the outer aerodynamic surface 27. Adjacent the fairing trailing edges 29, and extending from the reverse surface, the fairing 26 has a pair of projections 30. The projections 30 extend interiorly towards the blade shell 24 and also extend generally in the longitudinal direction X of the blade 7.

The projections 30 are received in longitudinally extending channels 31. The channels 31 may be formed in a generally U shaped moulded component 32 fixed to the blade shell 24 in the vicinity of the respective shoulders 28. The moulded U shape component 32 may be bonded to, or co-cured with, the blade shell 24.

Due to the build-up of manufacturing tolerances in a manufacture of the blade shell 24 the distance between the shoulders 28 (i.e. in the blade thickness direction) can be variable between several of the blades 7 but made to a common design. To accommodate this tolerance the leading edge fairing 26 may be sufficiently flexible to accommodate this variation in the distance between the shoulders 28. The flexibility of the leading edge fairing 26 may be selected so as to urge the projections 30 into the respective channels 31 even when the distance between the shoulders 28 is at a minimum (of the acceptance tolerance range). Where the distance between the shoulders 28 reaches a maximum (of the acceptance tolerance range) it can be expected that the radius of curvature of the fairing leading edge would reach a maximum and the gap between the reverse face of the fairing 26 and the blade shell 24 would reach a minimum.

The projections 30 received in the channels 31 enable positional alignment freedom in the longitudinal direction X of the blade between the leading edge fairing 26 and the blade shell 24. To this end the projections 30 have a generally continuous constant cross section in the blade longitudinal direction X. Likewise, the channels 31 have a generally continuous constant cross section in the longitudinal direction X of the blade. The cross section of the projections 30 may be continuous across the spanwise width of the leading edge panel 26. The projections 30 may be formed as a single continuous projection extending across substantially the full spanwise width of the leading edge panel 26, or alternatively the projections may be a series of discrete projections at spaced intervals across the spanwise width of the leading edge panel 26. Providing a series of spaced projections may enable the leading edge fairing 26 to better conform to the planform curvature of the blade leading edge 10. As will be understood, planform curvature of the blade leading edge is viewed in a direction normal to the blade chord and normal to the blade longitudinal axis X.

The leading edge fairing 26 is intended to be a modular replacement part of the blade 7 so that as the leading edge fairing 26 suffers environmental erosion from droplets and particles the leading edge fairing 26 may be readily replaced without disrupting the blade shell 24. The leading edge fairing 26 may be provided as a plurality of leading edge fairing sections across the spanwise extent of the blade leading edge 10. Blade leading edge erosion is typically more pronounced towards the blade tip end 9 where the blade velocity is highest during rotation of the wind turbine rotor. The leading edge fairings 26 may therefore be provided across only part of the span of the blade 7, e.g. across the outboard half or outboard third of the blade span, but may of course be provided across substantially the full spanwise extent of the blade 7.

The leading edge fairing 26 may be provided as a plurality of fairing sections in the blade spanwise direction. Each blade fairing section may have a spanwise width of approximately 1 metre but, depending on requirements, this spanwise width may be greater or less than approximately 1 metre. Where the leading edge fairing is provided as a plurality of fairing sections, one of the lateral edges of each fairing section may be provided with a rebate so as to nest with an (unrebated) lateral edge of an adjacent fairing section. The rebated lateral edge would then sit behind the lateral edge of the adjacent fairing section and the joint between adjacent fairing sections filled so as to substantially prevent a flow of air between the adjacent fairing sections.

Where the leading edge fairing 26 meets the blade shell 24 adjacent to the shoulder 28 a filler material may be used between the trailing edge of the leading edge fairing 26 and the forward edge of the outer aerodynamic surface of the blade shell 24 so as to ensure aerodynamic continuity and avoid an aerodynamic step in the outer aerodynamic surface of the blade and also to substantially prevent any flow of air through the joint between the leading edge fairing 26 and the blade shell 24.

By preventing airflow either between adjacent fairing sections or between the leading edge fairing and the blade shell 24, environmental erosion at these joints may be suppressed. As shown in FIG. 3 the leading edge fairing 26 may incorporate an erosion strip 40 in the vicinity of the blade leading edge 10. The erosion strip 40 may be formed of a harder and/or tougher material than that of the main body of the leading edge fairing 26. The erosion strip 40 may occupy a relatively small region either side of the blade leading edge 10 so as to protect the leading edge fairing 26 in the region where environmental erosion through droplet and particle impingement is most likely to occur. The erosion protection strip 40 may be bonded or otherwise affixed to the main body of the leading edge fairing 26. The erosion strip 40 may be situated in a shallow recess in the leading edge fairing 26.

When the leading edge fairing 26, or the one or more leading edge fairing sections, is judged to require replacement the turbine 1 can be stopped and the replacement of the leading edge fairing or one or more of the leading edge fairing sections may be carried out without the need to remove the blade 7 to which the fairing is attached from the wind turbine 1. This modular replacement of the leading edge fairing 26 provides a substantial improvement in maintenance cost of the blade 7 as compared with a blade without such a leading edge fairing.

The manner in which the leading edge 26 may be removed and replaced will be dependent on the type of connection between the projection 30 and the channel 31 which holds the leading edge fairing 26 in place. Some examples of different mechanisms for engaging the projection 30 with the channel 31 will now be described.

Figure 4:
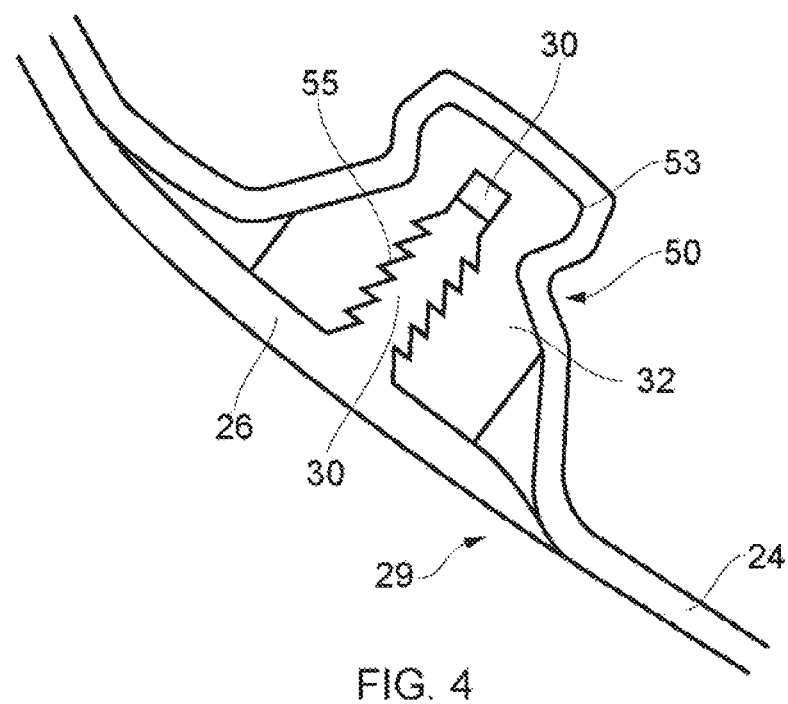
FIG. 4 shows a detail view of the fairing attachment to the blade body.

FIG. 4 shows a detailed view of the connection between the leading edge fairing 26 and the blade shell 24. The blade body has a groove 50 extending generally in the longitudinal direction X of the blade 7. The groove 50 receives a moulded-in component 32 having a channel 31, the channel 31 also extending generally in the longitudinal direction X of the blade 7.

The groove 50 may form a re-entrant 53 to mechanically interlock the moulded-in component 32 to the groove 50. More generally, the moulded-in component 32 may be mechanically interlocked with the blade shell 24.

The leading edge fairing 26 may have a projection 30 with barbs 55 or other features to mechanically interlock with the channel 31 formed in the moulded-in component 32. The moulded-in component 32 may comprise a resiliently deformable material which accepts the barbs 55 of the projection 30 when the leading edge fairing 26 is forced such that the projection 30 enters the channel 31.

The channel 31 may have a depth to accept the projection 30 so as to provide a clearance to accommodate tolerance variation. The barbs 55 or other mechanically interlocking feature of the projection 30 may be oriented to facilitate entry of the projection 30 into the channel 31 but so as to prevent removal of the projection 30 from the channel 31 during normal operation of the wind turbine blade 7. Of course, if sufficient force is applied in a removal direction so as to remove the projection 30 from the channel 31, e.g. for replacement of the leading edge fairing 26, the mechanically interlocking features of the projection 30 may be designed so as to not cause any significant damage to the moulded-in component 32.

It will also be appreciated that the moulded-in component 32 could be removed from the groove 50 in case of any such damage and the moulded-in component 32 could be re-formed in the groove 50 by introducing a curable material in to the groove and curing the material to form once again the moulded-in component 32.

The leading edge fairing 26 may be held with respect to the blade shell 24 without the use of adhesives, e.g. by making use of mechanically interlocking features between the groove 50 and the moulded-in component 32 and/or between the channel 31 and the projection 30.

As can also be seen in FIG. 4, the trailing edge 29 of the leading edge fairing 26 may be faired and/or filled to provide a smooth continuous aerodynamic contour between the leading edge fairing 26 and the blade shell 24.

Figure 5:
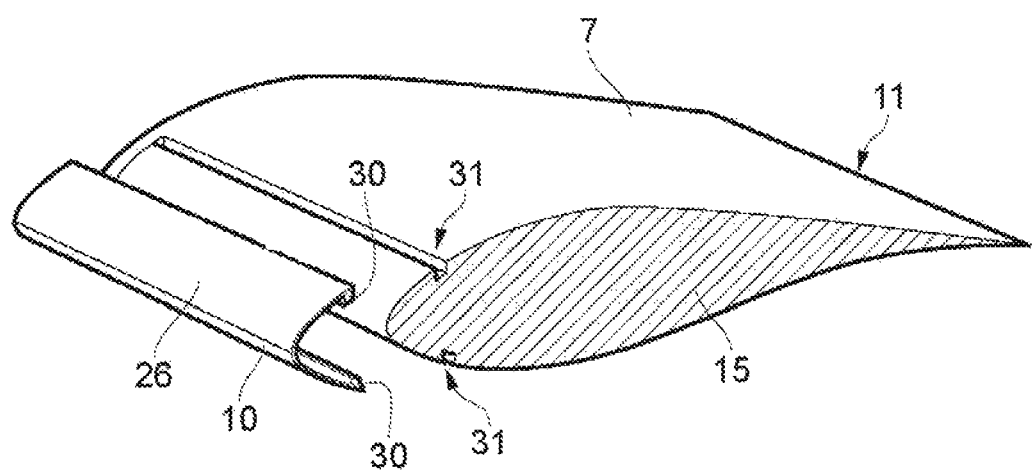
FIG. 5 shows a partial cut away view of the blade body having a leading edge fairing according to a second example.

FIG. 5 shows another example of the leading edge fairing 26 for attachment to the blade body 15. Like reference numerals are used to denote like parts with the examples described above and only the differences will be elaborated here. Like in the previous example, the leading edge fairing 26 has a pair of projections 30 which engage with respective channels 31 in the blade body 15. The channels 31 and the projections 30 extend generally in the blade longitudinal direction X.

In the example shown in FIG. 5 the channels 31 may have generally parallel sides and the projections 30 may also have generally parallel sides. The parallel sides of the channels and the projections may extend generally in the blade longitudinal direction X. Unlike in the previous example shown in FIG. 4, the projections 30 engage with their respective channels 31 by magnetic attraction. For example, a permanent magnet may be installed within the projections 30 and a ferrous material, such as steel for example, may be embedded adjacently channels 31. Magnetic attraction between the projection 30 and the channel 31 may hold the leading edge fairing 26 in situ with respect to the blade body 15.

Figure 6:
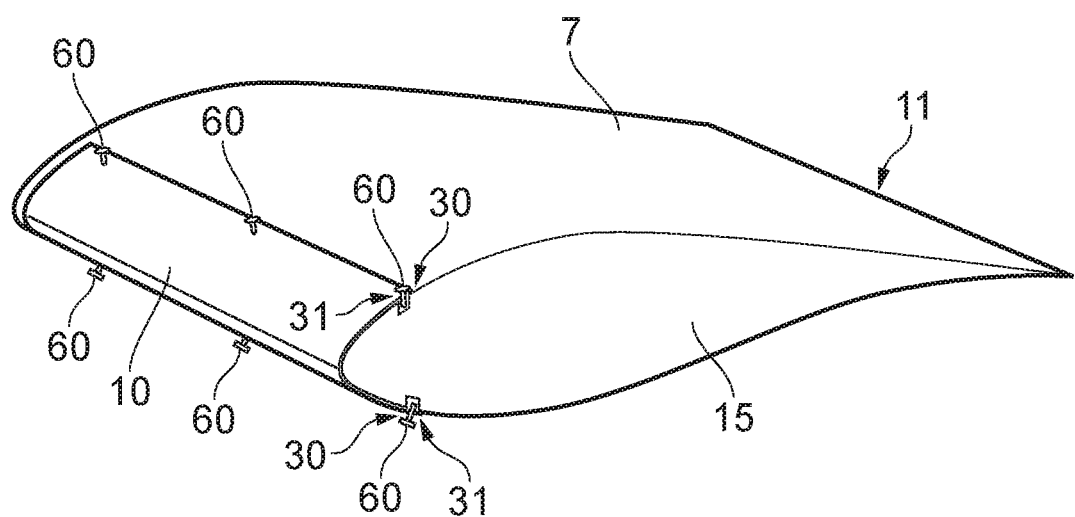
FIG. 6 shows a partial cut away view of the blade body having a leading edge fairing according to a third example.

FIG. 6 shows a further example in which like reference numerals are used to denote like parts with the examples described above and only the differences will be elaborated here. The example shown in FIG. 6 is similar in many respects to the examples shown in FIG. 5, but instead of the magnetic force used to hold the projections 30 in the channels 31, a series of screw threaded fasteners 60 are used to hold the projections 30 in the channels 31. The screw threaded fasteners 60 may be removable. The screw threaded fasteners 60 may be received in fastener receptacles in their respective channel 31. The fasteners may have countersunk heads to sit substantially flush with the outer aerodynamic surface of the leading edge fairing. The fasteners may be bolts or screws, for example.

It will be appreciated that whilst in the examples described above the leading edge fairing 26 has a pair of similar projections to engage with the respective channels by a variety of different mechanisms, the mechanisms described are not exhaustive and the projections may be held in the channels by an adhesive, by a snap fit connection or by any other suitable means.

It will also be appreciated that the same connection mechanism may not be used for each of the projections. Indeed in some examples only a single projection for engaging with a corresponding channel may be required, rather than a pair of projections and corresponding pair of channels. Attachment of the leading edge fairing to the blade body may be by fasteners in the absence of a projection and corresponding channel at one trailing edge of the leading edge fairing, whilst a projection and corresponding channel may be provided at the other trailing edge of the leading edge panel. Also, combinations of the different attachment mechanisms described above may be used in combination on the same leading edge fairing. For example, fasteners may be used at one edge of the leading edge fairing and a clip on or snap fit connection may be used at the other edge, or intermediate section, of the same fairing, or fairing segment.

Various other combinations and permutations will be apparent to those skilled in the art.

The leading edge fairing may comprise a thermoplastic, composite, or metallic material. Where a metallic material is used the leading edge fairing may perform a dual function as a lightning strike receptor for connection to the lightning protection system of the wind turbine.

The erosion protection strip may be used in conjunction with any of the leading edge fairing examples described above, and may optionally be a fibre reinforced material, or a polymer such as Nylatron.

It will further be appreciated that the blade 7 may comprise a plurality of blade segments which are joined together to form the complete blade (a so called 'split blade'). The blade segments may each be manufactured and transported separately or in groups before joining the blade segments together at the wind turbine erection site.

Where the blade, or a segment of a split blade, comprises two half shells and the half shells overlap adjacent the blade leading edge (such as shown in the example illustrated in FIG. 3) it has traditionally been the case that the overlapping blade shells require over-laminating where the overlapping blade shells form the blade leading edge structure. By providing the leading edge fairing as the leading edge structure of the blade and setting the overlapping blade shells behind the leading edge fairing it may be sufficient to bond the overlapping half shells together without also over-laminating. The use of the leading edge fairing also provides a better aerodynamic profile, compared to a blade that has been over-laminated at the leading edge.

Although the invention has been described above with reference to one or more preferred embodiments, it will be appreciated that various changes or modifications may be made without departing from the scope of the invention as defined in the appended claims.

The invention claimed is:

1. A wind turbine blade, comprising:
   a blade body having a root, a tip, and a longitudinal direction extending between the root and the tip; and
   a leading edge fairing having a generally C-shaped profile with a leading edge, a first trailing edge, and a second trailing edge,
   wherein the blade body has a first channel extending in the longitudinal direction and a second channel extending in the longitudinal direction,
   wherein the leading edge fairing has a first projection adjacent the first trailing edge extending into the first channel and extending in the longitudinal direction so as to be received in the first channel, and a second projection adjacent the second trailing edge extending in the second channel and extending in the longitudinal direction so as to be received in the second channel, and wherein each of the first channel and the first projection and the second channel and the second projection have mechanically interlocking profiles extending in the longitudinal direction.

2. The wind turbine blade according to claim 1, wherein the first channel and the first projection have corresponding profiles.

3. The wind turbine blade according to claim 1, wherein the first channel has a depth direction, and the first channel and the first projection are configured to resist pull-out of the first projection from the first channel in the depth direction of the first channel.

4. The wind turbine blade according to claim 1, wherein the first projection is integrally formed with the leading edge fairing.

5. The wind turbine blade according to claim 1, wherein the first channel is formed in a moulded component.

6. The wind turbine blade according to claim 5, wherein the blade body has a groove extending in the longitudinal direction and the moulded component is received in the groove.

7. The wind turbine blade according to claim 6, wherein the moulded component and the groove have mechanically interlocking profiles.

8. The wind turbine blade according to claim 1, wherein the first projection is held in the first channel by one or more of a magnet, a fastener, a snap-fit connection or an adhesive.

9. The wind turbine blade according to claim 8, wherein the fastener extends through the first projection.

10. The wind turbine blade according to claim 1, wherein the first projection of the leading edge fairing comprises a plurality of projection portions, wherein the first channel in the blade body comprises a plurality of channel portions, and wherein each of the plurality of projection portions is configured to be received in a respective one of the plurality of channel portions.

11. The wind turbine blade according to claim 1, wherein the leading edge fairing further includes an erosion protection strip.

12. The wind turbine blade according to claim 1, wherein the leading edge fairing includes thermoplastic, metallic or composite material.

13. The wind turbine blade according to claim 1, wherein the blade body comprises a rebate and the leading edge fairing is located in the rebate such that an outer surface of the leading edge fairing and an outer surface of the blade body form a continuous contour.

14. A method of fitting a leading edge fairing to a wind turbine blade, comprising:
providing a blade body having a root, a tip, and a longitudinal direction extending between the root and the tip, wherein the blade body has a first channel extending in the longitudinal direction and a second channel extending in the longitudinal direction;
providing a leading edge fairing having a generally C-shaped profile with a leading edge, a first trailing edge, and a second trailing edge, the leading edge fairing further including a first projection adjacent the first trailing edge and a second projection adjacent the second trailing edge; and
attaching the leading edge fairing to the blade body by inserting the first projection in the first channel whereby the first projection extends in the longitudinal direction, and inserting the second projection in the second channel whereby the second projection extends in the longitudinal direction.

15. The method according to claim 14, further comprising a removing an existing leading edge fairing from the blade body prior to attaching the leading edge fairing to the blade body to effect a leading edge fairing replacement.

16. A leading edge fairing for attachment to a blade body of a wind turbine blade, the leading edge fairing comprising:
an aerodynamic surface defining a generally C-shaped profile with a leading edge, a first trailing edge, and a second trailing edge,
a reverse surface opposite the aerodynamic surface,
a first projection adjacent the first trailing edge extending away from the reverse surface and extending in a longitudinal direction of the leading edge fairing, wherein the first projection is configured to be received in a first channel of the blade body in a first mechanical interlock, which first channel extends in a longitudinal direction of the blade body between a root and a tip of the blade; and
a second projection adjacent the second trailing edge extending away from the reverse surface and extending in the longitudinal direction of the leading edge fairing, wherein the second projection is configured to be received in a second channel of the blade body in a second mechanical interlock, which second channel extends in the longitudinal direction of the blade body.

17. A kit of parts comprising a plurality of the leading edge fairings according to claim 16, wherein the plurality of fairings have different leading edge radii and/or planform curvature.

18. A wind turbine blade, comprising:
a blade body having a root, a tip, and a longitudinal direction extending between the root and the tip, the blade body further including a groove extending in the longitudinal direction;
a moulded component received in the groove and including at least one channel extending in the longitudinal direction; and
a leading edge fairing having at least one projection extending in the longitudinal direction, the at least one projection extending into the at least one channel of the moulded component to couple the leading edge fairing to the blade body.

19. A method of fitting a leading edge fairing to a wind turbine blade, comprising:
providing a blade body having a root, a tip, and a longitudinal direction extending between the root and the tip, wherein the blade body has a groove extending in the longitudinal direction and a moulded component received in the groove and includes at least one channel extending in the longitudinal direction;
providing a leading edge fairing having at least one projection; and
attaching the leading edge fairing to the blade body by inserting the at least one projection in the at least one channel whereby the at least one projection extends in the longitudinal direction.

* * * * *